United States Patent [19]
Blitz

[11] 3,961,535
[45] June 8, 1976

[54] SPIN RATE COMPENSATOR
[75] Inventor: Daniel Blitz, Boston, Mass.
[73] Assignee: Sanders Associates, Inc., Nashua, N.H.
[22] Filed: Feb. 10, 1975
[21] Appl. No.: 548,306

[52] U.S. Cl. .............................. 73/505; 73/517 R; 73/518
[51] Int. Cl.² .................... G01C 21/12; G01P 15/08
[58] Field of Search ............. 73/505, 516 R, 517 R, 73/518; 74/5 R, 5.4, 5.6 D; 324/163, 173, 174

[56] References Cited
UNITED STATES PATENTS

| | | | |
|---|---|---|---|
| 2,301,115 | 11/1942 | Gilbert | 324/163 |
| 2,605,093 | 7/1952 | Dorand | 73/516 R |
| 2,768,331 | 10/1956 | Cetrone | 324/163 X |
| 3,014,374 | 12/1961 | Johnston, Jr. | 73/517 R |
| 3,424,010 | 1/1969 | Pollack | 74/5 X R |

Primary Examiner—James J. Gill
Attorney, Agent, or Firm—Louis Etlinger; Richard I. Seligman

[57] ABSTRACT

Compensation for spin rate variation of an inertial measurement device comprising at least one translational acceleration transducer which is spun is achieved by passing the output signal from the translational acceleration transducer(s) through a circuit which has a frequency response inversely proportional to frequency.

8 Claims, 6 Drawing Figures

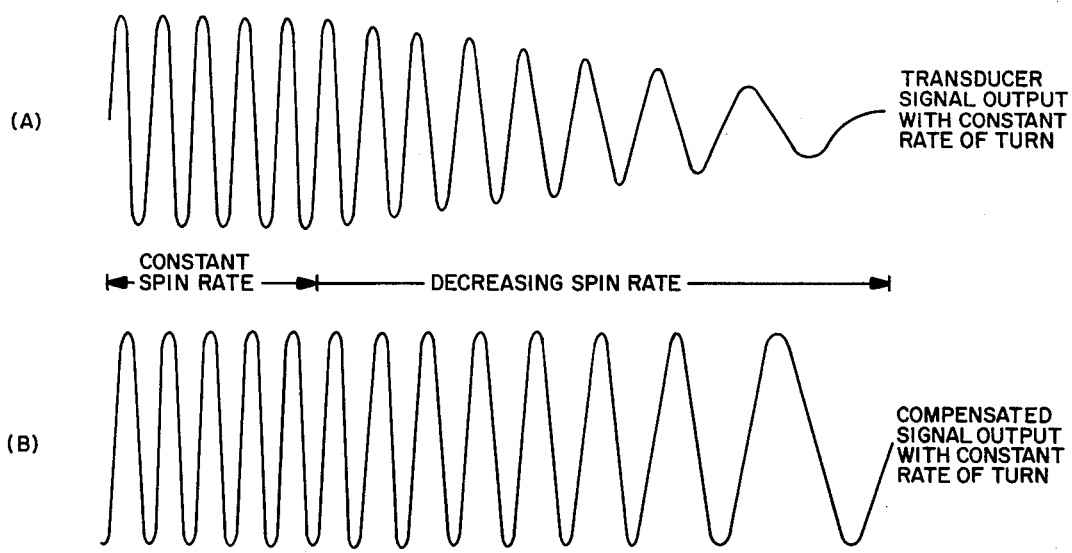

(A) TRANSDUCER SIGNAL OUTPUT WITH CONSTANT RATE OF TURN

CONSTANT SPIN RATE — DECREASING SPIN RATE (B) COMPENSATED SIGNAL OUTPUT WITH CONSTANT RATE OF TURN

FIG. 1

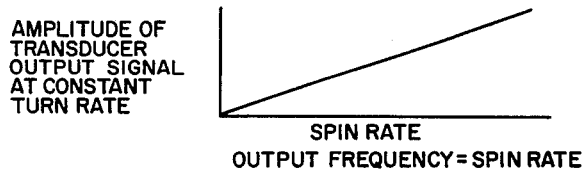

AMPLITUDE OF TRANSDUCER OUTPUT SIGNAL AT CONSTANT TURN RATE

SPIN RATE
OUTPUT FREQUENCY = SPIN RATE

FIG. 2A

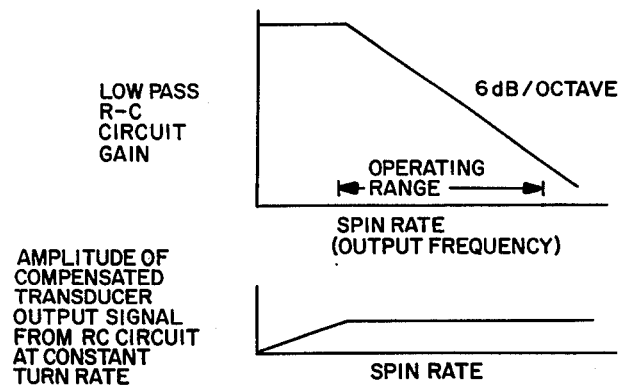

LOW PASS R-C CIRCUIT GAIN 6 dB/OCTAVE

OPERATING RANGE

SPIN RATE (OUTPUT FREQUENCY)

FIG. 2B

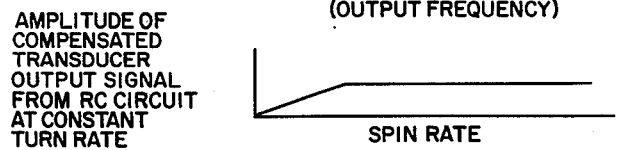

AMPLITUDE OF COMPENSATED TRANSDUCER OUTPUT SIGNAL FROM RC CIRCUIT AT CONSTANT TURN RATE

SPIN RATE

FIG. 2C

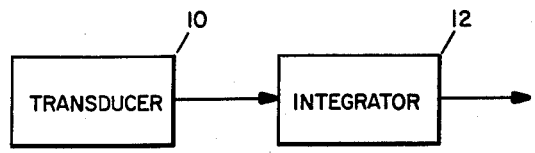

FIG. 3

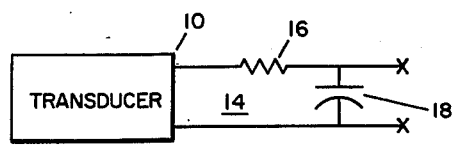

FIG. 4

SPIN RATE COMPENSATOR

BACKGROUND OF THE INVENTION

There are applications wherein both the output frequency and sensitivity of a measuring device are proportional to the rate at which the device is spinning. One class of such devices is disclosed in U.S. patent application Ser. No. 528,243 filed on Nov. 29, 1974 for "Apparatus for Performing Inertial Measurements Using Translational Acceleration Transducers and for Calibrating Translational Acceleration Transducers" and assigned to the assignee of the present application. In this application there is disclosed apparatus for measuring angular velocity by spinning one or more translational acceleration transducers, at least one of which is placed parallel to the spin axis, spinning around an axis perpendicular to the turn axis. The transducer output signal = K $x$ turn rate $x$ spin rate $x$ cos ($2\pi x$ spin rate $x$ time) where K is a constant depending upon system geometry and transducer sensitivity. It is thus seen that the output signal is a cosine wave of the same frequency as the spin rate with an amplitude proportional to the turn rate multiplied by the spin rate. Thus, to achieve accurate turning angular rate measurements using such a device it has been necessary to know the spin rate by either maintaining the spin rate of the transducer constant or by independently measuring it and making suitable adjustment.

In many applications this may be no problem as the transducer can be spun using synchronous or other regulated motors. However, one of the objects of the device is to provide inexpensively a gyroscope substitute. To do same inexpensively necessitates for some applications the use of an inexpensive spin motor such as a spring wound or dc electric motor. When such an unregulated motor is used, of course, the transducer is not spun at a constant rate. Also gas driven or impulse started turn rate indicators for boost-glide missiles where the system is given an initial excitation and then allowed to coast, thereby having an unknown, changing spin rate, necessitates spin rate measurement. Measurement of the changing spin rate will increase the cost and in certain application may be impractical.

Also in the aforementioned patent application there is described an application using spinning translational acceleration transducers on a spinning projectile to make inertial measurements. In this application the transducers are spun by the spinning projectile itself and therefore, no additional spin motors are required. However, since a spinning projectile spins at a continuously decreasing rate during its trajectory, it is necessary to know the instantaneous spin frequency thereof to make accurate measurements. This requires the use of additional transducers on the spinning projectile to make such measurements or other spin measuring means. This can be both relatively expensive and difficult.

SUMMARY OF THE INVENTION

Accordingly, it is an object of this invention to provide a spin rate compensator.

It is another object of this invention to provide apparatus for making the sensitivity of a translational acceleration tranducer angular rate sensor independent of its spin rate.

It is a further object to provide a spin rate compensator simply, inexpensively and compactly.

Briefly, the sensitivity of a translational acceleration transducer angular rate sensor is made independent of its spin rate by passing the output signal from the transducer through a circuit which has a frequency response inversely proportional to frequency. The output from such transducer is K $x$ turn rate $x$ spin rate $x$ cos ($2\pi x$ spin rate $x$ time) where K is a constant depending upon system geometry and transducer sensitivity. From the above equation it is seen that the output signal is a cosine wave of the same frequency as the spin rate with an amplitude proportional to the turn rate multiplied by the spin rate. By passing the output signal through a compensating circuit whose gain is inversely proportional to frequency, such as an integrator circuit or a low pass RC filter in the region where the output is attenuated at the rate of 6 db per octave, the compensating circuit output is equal to K $x$ turn rate $x$ spin rate $x$ 1/spin rate $x$ sin ($2\pi x$ spin rate $x$ time). (The signal phasing shifts from cos to sin because of the integration circuit.) The spin rate cancels out of the amplitude term leaving the compensated output signal equal to K $x$ turn rate $x$ sin ($2\pi x$ spin rate $x$ time) which is at the spin frequency but the amplitude of which is independent of spin rate.

BRIEF DESCRIPTION OF THE DRAWINGS

The above-mentioned and other features and other objects of this invention will become more apparent by reference to the following descripition taken in conjunction with the accompanying drawings, in which:

FIG. 1 are typical waveforms of an uncompensated and a compensated signal;

FIGS. 2A–2C are curves illustrating the theory of operation of the invention;

FIG. 3 is an illustration of one embodiment of the invention; and

FIG. 4 is an illustration of another embodiment of the invention.

DESCRIPTION OF PREFERRED EMBODIMENTS

Waveform A of FIG. 1 illustrates a typical signal from a spinning device which is both amplitude and frequency dependent upon the spin rate of the device. Though the turn rate is constant, when the spin rate decreases the amplitude and frequency also decrease. This characteristic of a transducer output signal is represented by the curve of FIG. 2A where it is shown that the amplitude of the transducer output signal is directly proportional to the spin rate of the transducer, though the turn rate is constant.

Compensation for change in spin rate of such a transducer is achieved by employing the circuit shown in FIG. 3 wherein the output from a transducer 10 is passed through an integrator 12. Integrator 12 is, for example, a conventional integrator comprised of both passive and active components, for example, an operational amplifier.

A simplified passive integrator or low pass RC circuit is shown in FIG. 4 wherein the output of transducer 10 is passed through an integrator 14 comprising a series resistor 16 and a shunt capacitor 18. The gain versus frequency of RC circuit 14 is shown in FIG. 2B. This is a low pass filter wherein the output thereof is substantially constant for a predetermined frequency portion and then drops at a 6 dB per octave rate. The sloping portion of the curve of FIG. 2B represents the operating range of integrator 14 contrasted to conventional low-pass filters wherein the operating range is the constant amplitude portion of the curve. The output from transducer 10 = K x turn rate x spin rate x cos ($2\pi x$ spin rate x time). By passing the output signal from transducer 10 through either circuit 12 or 14 whose gain is 1/spin rate (inversely proportional to frequency) in the region of interest, amplitude independent of frequency is achieved. The output from the compensating circuit = K x turn rate x spin rate x 1/spin rate x sin ($2\pi x$ spin rate x time). The spin rate cancels out of the amplitude term leaving the compensated output signal = K x turn rate x sin ($2\pi x$ spin rate x time) which is at the spin frequency but whose amplitude is independent of spin rate in the region of interest as illustrated by FIG. 2C. A typical output from such a compensating circuit is shown by waveform B of FIG. 1 wherein the frequency of the signal decreases with the spin rate however, the amplitude is independent thereof.

As mentioned above, normally, the characteristics of the circuit 14 would be selected to provide operation in the flat region or pass band of the low-pass filter. However, Applicant operates in the attenuating or sloping region thereby achieving spin rate compensation. The low pass-band of the filter also enhances the signal by filtering out any high frequency noise such as that produced by ball bearings.

The normal pass-band of the low pass filter is selected to be below the lowest frequency of interest which is just the reverse of the regular use of low-pass filters where the drop in the pass-band of the filter is selected to be above the highest frequency of interest.

While I have described above the principles of my invention in connection with specific apparatus, it is to be clearly understood that this description is made only by way of example and not as a limitation of the scope of my invention as set forth in the accompanying claims.

I claim:

1. Apparatus for providing spin rate compensation for a spinning device the output signal from which is proportional to spin rate in both frequency and amplitude and proportional to turn rate in amplitude, comprising:

a compensator coupled to the spinning device, said compensator having an amplitude response that is inversely proportional to frequency over the range of spin frequencies of interest.

2. Apparatus as defined in claim 1 wherein said compensator is an integrator.

3. Apparatus as defined in claim 1 wherein said compensator is a low-pass filter.

4. Apparatus as defined in claim 3, said low-pass filter having a cut-off frequency below the spin frequencies of the spinning device.

5. In combination with a translational acceleration transducer and means for spinning said transducer, a compensator coupled to said transducer and having an amplitude response inversely proportional to frequency over the range of spin frequencies of interest.

6. The combination of claim 5 wherein said compensator is an integrator.

7. The combination of claim 5 wherein said compensator is a low-pass filter.

8. The combination of claim 7, said low-pass filter having a cut-off frequency below the spin frequencies of the spinning transducer.

* * * * *